United States Patent
Joo et al.

(10) Patent No.: US 10,018,975 B2
(45) Date of Patent: Jul. 10, 2018

(54) HOME NETWORK CONTROL SYSTEM FOR CONTROLLING DEVICES IN A HOME NETWORK AND THE CONTROL METHOD THEREOF

(71) Applicant: SAMSUNG ELECTRONICS CO., LTD., Suwon-si (KR)

(72) Inventors: Ga-hyun Joo, Suwon-si (KR);
Chang-won Kim, Asan-si (KR);
Jung-hyun Shim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 851 days.

(21) Appl. No.: 14/532,344

(22) Filed: Nov. 4, 2014

(65) Prior Publication Data

US 2015/0192939 A1    Jul. 9, 2015

(30) Foreign Application Priority Data

Jan. 3, 2014 (KR) ........................ 10-2014-0000507

(51) Int. Cl.
*G05D 23/19* (2006.01)
*G05B 15/02* (2006.01)

(52) U.S. Cl.
CPC ...... *G05B 15/02* (2013.01); *G05B 2219/2642* (2013.01)

(58) Field of Classification Search
None
See application file for complete search history.

(56) References Cited

U.S. PATENT DOCUMENTS

| 7,295,099 | B2* | 11/2007 | Lee ........................ G05B 15/02 340/5.54 |
| 8,255,351 | B2 | 8/2012 | Lee et al. |
| 8,306,634 | B2 | 11/2012 | Nguyen et al. |
| 8,798,804 | B2* | 8/2014 | Besore ............... G06Q 30/0261 236/51 |
| 8,855,830 | B2* | 10/2014 | Imes ..................... F24F 11/006 700/276 |
| 9,092,971 | B2* | 7/2015 | Symoen ................. G08C 17/02 |

(Continued)

FOREIGN PATENT DOCUMENTS

| EP | 2477378 A1 | 7/2012 |
| KR | 10-2003-0075019 A | 9/2003 |

(Continued)

OTHER PUBLICATIONS

Communication dated Sep. 26, 2017 by the Korean Intellectual Property Office in counterpart Korean Patent Application No. 10-2014-0000507.

*Primary Examiner* — Van Nguyen
(74) *Attorney, Agent, or Firm* — Sughrue Mion, PLLC

(57) ABSTRACT

A home server, method, and system are provided. The method includes receiving user request information from a user terminal; collecting characteristic information of an environment in which the home server is provided; predicting a driving condition for driving a device in the home network so that the characteristic information matches the user request information; transmitting the driving condition to the user terminal; and controlling the at device according to the driving condition in response to receiving a confirm command for the driving condition from the user terminal.

20 Claims, 14 Drawing Sheets

(56) References Cited

U.S. PATENT DOCUMENTS

| | | | |
|---|---|---|---|
| 2004/0010327 A1* | 1/2004 | Terashima | G05B 15/02 700/83 |
| 2008/0271123 A1* | 10/2008 | Ollis | G08C 17/02 726/4 |
| 2010/0127854 A1 | 5/2010 | Helvick et al. | |
| 2012/0179547 A1* | 7/2012 | Besore | G06Q 30/0261 705/14.58 |
| 2013/0274937 A1* | 10/2013 | Ahn | H02J 3/14 700/291 |

FOREIGN PATENT DOCUMENTS

| KR | 10-0976443 B1 | 8/2010 |
|---|---|---|
| KR | 10-2012-0081816 A | 7/2012 |

* cited by examiner

HOME NETWORK CONTROL SYSTEM FOR CONTROLLING DEVICES IN A HOME NETWORK AND THE CONTROL METHOD THEREOF

CROSS-REFERENCE TO RELATED APPLICATION

This application claims priority from Korean Patent Application No. 10-2014-0000507, filed on Jan. 3, 2014, in the Korean Intellectual Property Office, the disclosure of which is incorporated by reference herein in its entirety.

BACKGROUND

1. Field

Apparatuses, devices, articles of manufacture, and methods consistent with exemplary embodiments relate to a home server and a network control method thereof, and a home network control system and a control method thereof, and more particularly, to a home server capable of predicting driving conditions of devices according to environments and a network control method thereof, and a home network control system and a control method thereof.

2. Description of the Related Art

In recent years, with development of smart devices, a user may control a plurality of devices, which exist in the home, using one terminal apparatus. In addition, the user may control the plurality of devices, which exist in the home, even outside the home. For example, the user may control ON/OFF of electronic apparatuses such as an air conditioner, set a temperature of a refrigerator, and so on inside the home using a user terminal apparatus such as a smart phone.

However, in order to perform such control, the user has to directly predict an environment state of the inside of the home or a device state. This may be difficult for the user to do. For example, it may be difficult for the user to predict the environment such as a temperature or humidity of the inside of the home by himself to simply control ON/OFF of the electronic devices such as an air conditioner outside the home. Therefore, there is a disadvantage in that, in response to too quickly turning on the air conditioner outside the home by the user based on his judgment, the temperature when the user arrives at home may be lower than an appropriate temperature, or power waste may be caused.

SUMMARY

One or more exemplary embodiments may overcome the above disadvantages and other disadvantages not described above. However, it is understood that one or more exemplary embodiments are not required to overcome the disadvantages described above, and may not overcome any of the disadvantages described above.

It is an aspect to provide a home server capable of predicting driving conditions of devices according to environments and a network control method thereof, and a home network control system and a control method thereof.

According to an aspect of an exemplary embodiment, there is provided a method of controlling a home server which manages a home network, the method comprising receiving user request information from a user terminal apparatus; collecting characteristic information of an environment in which the home server is provided; predicting a driving condition for driving at least one device in the home network so that the characteristic information matches the user request information; transmitting the driving condition to the user terminal apparatus; and controlling the at least one device according to the driving condition in response to receiving a confirm command for the driving condition from the user terminal apparatus.

The user request information may include at least one of a temperature, a humidity, a user arrival time, a washing start time, a washing completion time, an operation time of a multimedia content reproduction apparatus, and a content name to be reproduced.

The characteristic information may include at least one of an internal temperature of the environment, an internal humidity of the environment, an electronic program guide (EPG) information, and information related to a road traffic condition.

In response to the user request information including a temperature and a user arrival time, and the characteristic information including an internal temperature of the environment, the predicting of the driving condition may include calculating an operation start time and an operation duration of an heating and cooling device to change the internal temperature to the temperature.

In response to the user request information including a washing start time and the characteristic information including an internal temperature and internal humidity of the environment, the predicting of the driving condition may include calculating a laundry drying time or a washing completion prediction time according to the internal temperature and internal humidity.

In response to the user request information including a name of multimedia content to be displayed and information for a user location, and the characteristic information including electronic program guide (EPG) information and information related to a road traffic condition, the predicting of the driving condition may include calculating a time it will take for the user to arrive home to the environment according to the user location and the road traffic condition, and calculating a user departure time based on a broadcast time of the multimedia content and the time it will take for the user to arrive home.

According to another aspect of an exemplary embodiment, there is provided a home server which manages a home network, the home server comprising a communication interface configured to receive user request information from a user terminal apparatus; a sensor configured to collect characteristic information of an environment in which the home server is provided; a storage device; and a controller configured to predict a driving condition for driving at least one device in the home network so that the characteristic information matches the user request information, store the driving condition in the storage device, and transmit the driving condition to the user terminal apparatus through the communication interface, wherein, in response to receiving a confirm command for the driving condition from the user terminal apparatus through the communication interface, the controller controls the at least one device according to the driving condition stored in the storage device.

The user request information may include at least one of a temperature, a humidity, a user arrival time, a washing start time, a washing completion time, an operation time of a multimedia content reproduction apparatus, and a content name to be reproduced.

The characteristic information may include at least one of an internal temperature of the environment, an internal humidity of the environment, an electronic program guide (EPG) information, and information related to a road traffic condition.

In response to the user request information including a temperature and a user arrival time, and the characteristic information including an internal temperature of the environment, the controller may predict the driving condition by calculating an operation start time and an operation duration of a heating and cooling device to change the internal temperature to the temperature.

In response to the user request information including a washing start time, and the characteristic information including an internal temperature and internal humidity of the environment, the controller may predict the driving condition by calculating a laundry drying time or a washing completion prediction time according to the internal temperature and internal humidity.

The driving condition for driving at least one device may correspond to notifying the user terminal device, and in response to the user request information including a name of multimedia content to be displayed and information for a user location, and the characteristic information including electronic program guide (EPG) information and information related to a road traffic condition, the controller may calculate a time it will take for the user to arrive home to the environment according to the user location and the road traffic condition, and may predict the driving condition by calculating a user departure time based on a broadcast time of the multimedia content and the time it will take for the user to arrive home.

According to another aspect of an exemplary embodiment, there is provided a home network control system, comprising a user terminal apparatus configured to receive user request information and transmit the received user request information to a home server; and the home server configured to collect characteristic information of an environment in which the home server is provided, predict a driving condition for driving at least one device in a home network including the home server so that the characteristic information matches the received user request information, and transmits the predicted driving condition to the user terminal apparatus, wherein the user terminal apparatus displays the driving condition received from the home server, and, in response to receiving a confirm command input by the user, transmits a confirm command to the home server.

According to another aspect of an exemplary embodiment, there is provided a method comprising receiving an input of user request information and transmitting the input user request information to a home server, by a user terminal apparatus; collecting characteristic information of an environment of the home server by the home server; predicting a driving condition for driving at least one device in a home network that includes the home server so that the characteristic information matches the received user request information and transmitting the predicted driving condition to the user terminal apparatus, by the home server; displaying the driving condition received from the home server, by the user terminal apparatus; and transmitting a confirm command to the home server from the user terminal apparatus in response to input of the confirm command by the user at the user terminal apparatus.

The environment may comprise an internal environment and an external environment of the home server.

The method may further comprise periodically collecting updated characteristic information of the environment, and re-predicting the driving conditions based on the updated characteristic information.

According to another aspect of an exemplary embodiment, there is provided a home server communicatively coupled to a home network, the home server comprising a communication interface configured to receive control information; a sensor configured to collect characteristic information of an environment of a home associated with the home server; a storage device; and a controller configured to predict a control condition for controlling a device communicatively coupled to the home server according to the received control information and the collected characteristic information, store the control condition in the storage device, and transmit the control condition through the communication interface, wherein, in response to receiving a confirm command through the communication interface, the controller controls the device according to the control condition stored in the storage device.

The device may be a user terminal apparatus from which the control information is received.

The control information may be received from a user terminal apparatus, and the device may be a device included in the home network.

BRIEF DESCRIPTION OF THE DRAWING FIGURES

The above and/or other aspects will be more apparent by describing in detail certain exemplary embodiments, with reference to the accompanying drawings, in which.

DETAILED DESCRIPTION OF THE EXEMPLARY EMBODIMENTS

Figure 1:
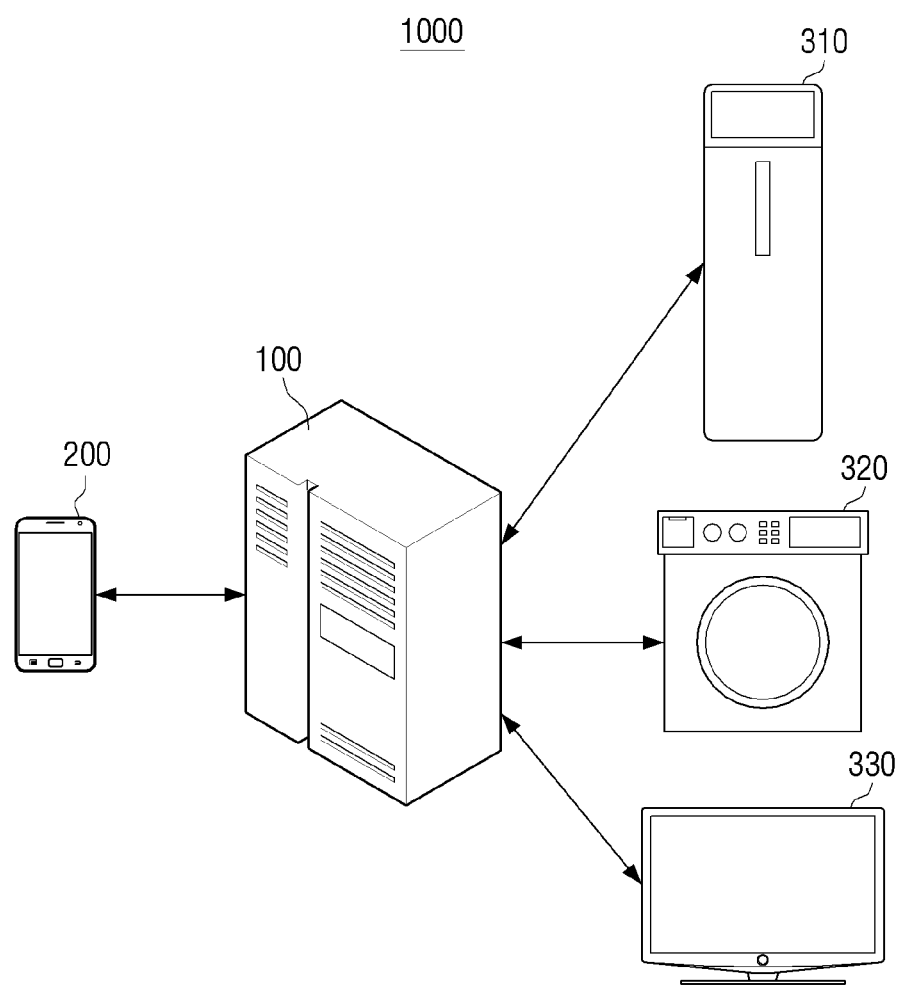
FIG. 1 is a view illustrating an example of a configuration of a home network system according to an exemplary embodiment.

Hereinafter, exemplary embodiments will be described in more detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a view illustrating a configuration of a home network system according to an exemplary embodiment. As illustrated in FIG. 1, a home network system 1000 includes a home server 100, a user terminal apparatus 200, and at least one device.

The user terminal apparatus 200 may be an electronic apparatus which may receive a user command, such as a portable phone, a tablet personal computer (PC), or a laptop computer. The device may include one or more of a heating and cooling device 310, a washing machine 320, and a television (TV) 330 as illustrated in FIG. 1. However, this is merely exemplary, and the device may be implemented with various apparatuses such as various illumination equipment, security equipment, or home appliances (for example, a cleaner, a refrigerator, etc.) used in the home for the convenience of the user.

Figure 2:
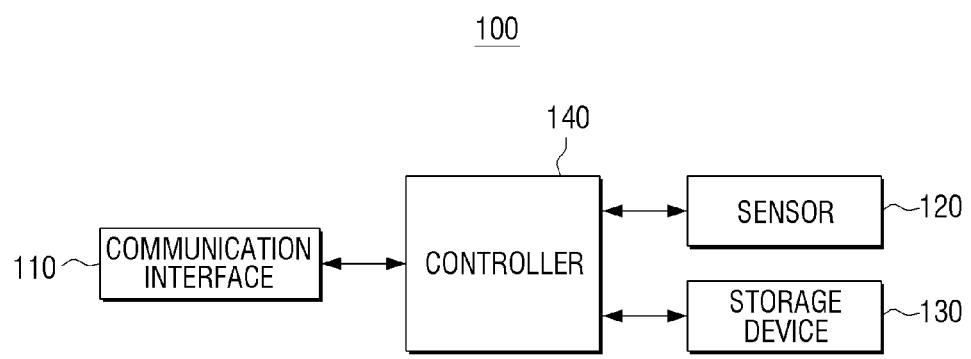
FIG. 2 is a view illustrating an example of a configuration of a home server according to an exemplary embodiment.

FIG. 2 is a view illustrating an example of a configuration of a home server according to an exemplary embodiment. The home server 100 includes a communication interface 110, a sensor 120, a storage device 130, and a controller 140 as illustrated in FIG. 2.

The communication interface 110 is configured to perform communication with various types of external apparatuses according to various types of communication methods. For example, the communication interface 110 may be a wired or wireless interface, and may include multiple interfaces configured to communicate according to the different communication methods. The communication interface 110 may receive user request information from the user terminal apparatus 200.

The user request information is information used for driving various devices to set an environment of the home to a user's desired environment. That is, the user request information may include a desired temperature, desired humidity, a user arrival time, a washing start time, a washing completion time, an operation time of a multimedia content reproduction apparatus, and/or a content name to be reproduced, etc.

That is, the communication interface 110 may receive the user request information input through the user terminal apparatus 200.

Further, the communication interface 110 may receive information from an external server. For example, the communication interface 110 may receive electronic program guide (EPG) information or road traffic condition information from the external server.

Information including content information commonly called content-related information is referred to as the EPG information. For example, the EPG information may include any information related to content, such as a content name, a content type, content classification, a reproduction duration, a cast, a director, and/or a writer, etc. The content information may include any information corresponding to the content, such as a content name, a content broadcast period of time, a content broadcast day, a content broadcast time, a content type, content classification, a content director, a content cast, and/or a content plot, etc.

The road traffic condition information may include route information of a public transportation and/or real-time road condition information. That is, the road traffic condition information is information used as the basis for accurately calculating the time necessary for the user to move from a first point to a second point.

The sensor 120 is configured to collect characteristic information of an environment. For example, when the home server 100 is located inside a home, the environment may include an environment inside the home and an environment outside the home. In such a case, the sensor 120 may include multiple sensors placed throughout the inside of the home and/or throughout the outside of the home to collect data on the characteristic information. The characteristic information may include various pieces of information indicating a characteristic inside the home and/or a characteristic outside the home. For example, the characteristic information may include an internal temperature of the environment, internal humidity of the environment, EPG information, and/or road traffic condition information, etc.

That is, the sensor 120 may include various kinds of sensors such as a temperature sensor, a humidity sensor, or a luminance sensor, and sense the internal temperature, internal humidity, internal luminance, or the like of the environment.

The storage device 130 is configured to store various software modules, data, or the like for driving the home server 100. For example, software including a base module, a sensing module, a communication module, and a service module may be stored in the storage device 130.

The storage device 130 may store control information for controlling a device using the controller 140. For example, the storage device 130 may calculate an operation start time and an operation duration of a heating and cooling device, which are used to control an internal temperature of the home that is sensed by the sensor 120 to be a desired temperature received from the user terminal apparatus 200, and store the calculated result.

That is, the storage device 130 may store the operation start time and the operation duration of the heating and cooling device, and the controller 140 may transmit the information stored in the storage device 130 to the user terminal apparatus 200 at a preset time.

The controller 140 is configured to control an overall operation of the home server 100. The controller 140 may predict a driving condition for driving at least one device in a home network so that the characteristic information collected in the sensor 120 matches the user request information received through the communication interface 110.

For example, in response to receiving a desired temperature and a user arrival time from the user terminal apparatus 200 through the communication interface 110, and sensing an internal temperature of the home through the sensor 120, the controller 140 may calculate the operation start time and the operation duration of the heating and cooling device 310, which are necessary for the internal temperature of the home to be the desired temperature at the user arrival time, and predict the driving condition.

The controller 140 may transmit the predicted driving condition to the user terminal apparatus 200 through the communication interface 110. In response to receiving a confirm command for the driving condition from the user terminal apparatus 200 through the communication interface 110, the controller 140 may control the heating and cooling device 310 in the home according to the driving condition stored in the storage device 130 so that the home is at the desired temperature when the user arrives home.

For example, in response to calculating, as the driving condition, the operation start time and the operation duration of the heating and cooling device 310, which are necessary for the internal temperature of the home to be changed to the desired temperature, the controller 140 transmits the operation start time and the operation duration to the user terminal apparatus 200 through the communication interface 110. Then, in response to receiving a user command for driving the heating and cooling device 310 at the operation start time from the user terminal apparatus 200, the controller 140 controls an operation of the heating and cooling device 310 to start at the operation start time.

As described above, through the home server 100, the user may predict the driving condition of a device, such as the operation start time of the device inside the home, according to the environment condition inside the home only by a simple operation which inputs the user request information, such as the desired temperature, from the outside of the home.

Figure 3:
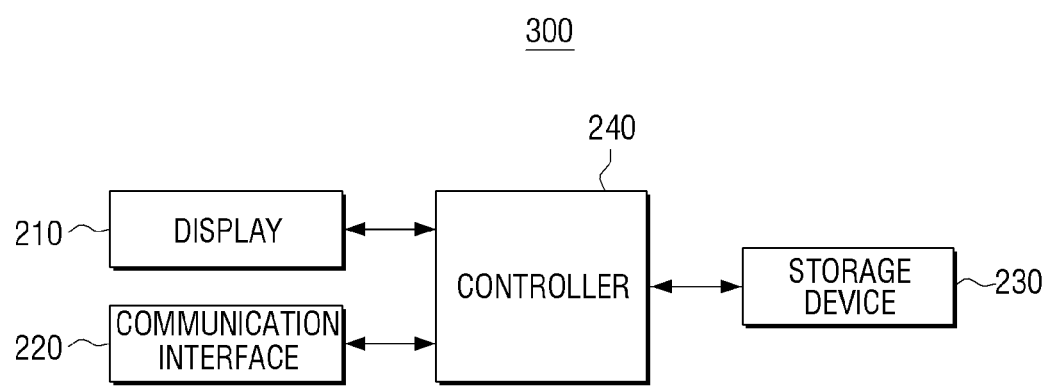
FIG. 3 is view illustrating an example of a configuration of a user terminal apparatus according to an exemplary embodiment.

FIG. 3 is a view illustrating the user terminal apparatus 200 according to an exemplary embodiment. The user terminal apparatus 200 may be a portable phone. However, this is merely exemplary, and the user terminal apparatus 200 may be implemented with various electronic apparatuses including a display and a communication interface, such as a tablet PC, a laptop computer, or a personal digital assistant (PDA). As illustrated in FIG. 3, the user terminal apparatus 200 includes a display 210, a communication interface 220, a storage device 230, and a controller 240.

The display 210 is configured to display multimedia content and various user interfaces (UIs). In particular, the display 210 may display information received from the home server 100, and display a UI for controlling at least one device in a home network. That is, through the UI for performing communication with the home server 100 and the home network displayed in the display 210, the user terminal apparatus 200 may receive the user request information, and display the environment information and the driving condition received from the home server 100.

The display 210 may display a notification window configured to notify the driving condition received from the home server 100 every preset period.

The communication interface 220 is configured to perform communication with various types of external apparatuses according to various types of communication methods. For example, the communication interface 110 may be a wired or wireless interface, and may include multiple interfaces configured to communicate according to the different communication methods. The communication interface 220 may perform communication with the home server 100. The communication interface 220 may transmit the received user request information to the home server 100. The communication interface 220 may receive the environment information such as the internal temperature of the home from the home server 100.

The storage device 230 is configured to store various software modules and data for driving the user terminal apparatus 200. For example, software including a base module, a sensing module, a communication module, a presentation module, a web browser module, and a service module may be stored in the storage device 230. The storage device 230 may store frequently used user request information. For example, the storage device 230 may store a multimedia content name frequently input from the user.

The controller 240 controls an overall operation of the user terminal apparatus 200. In particular, the controller 240 may control the user request information to be received through an input unit, such as a mouse, keyboard, trackball, touch screen, etc., included in the user terminal apparatus 200, control the display 210 to display the input user request information, store the received user request information in the storage device 230, and control the stored user request information to be transmitted to the home server 100 through the communication interface 220.

The controller 240 may control the communication interface 220 to receive driving information from the home server 100, and control the display 210 to display the received driving information.

As described above, through the user terminal apparatus 200, the user may easily transmit the user request information to the home server and check the driving condition of each device according to the environment, through a simple operation.

Figure 4:
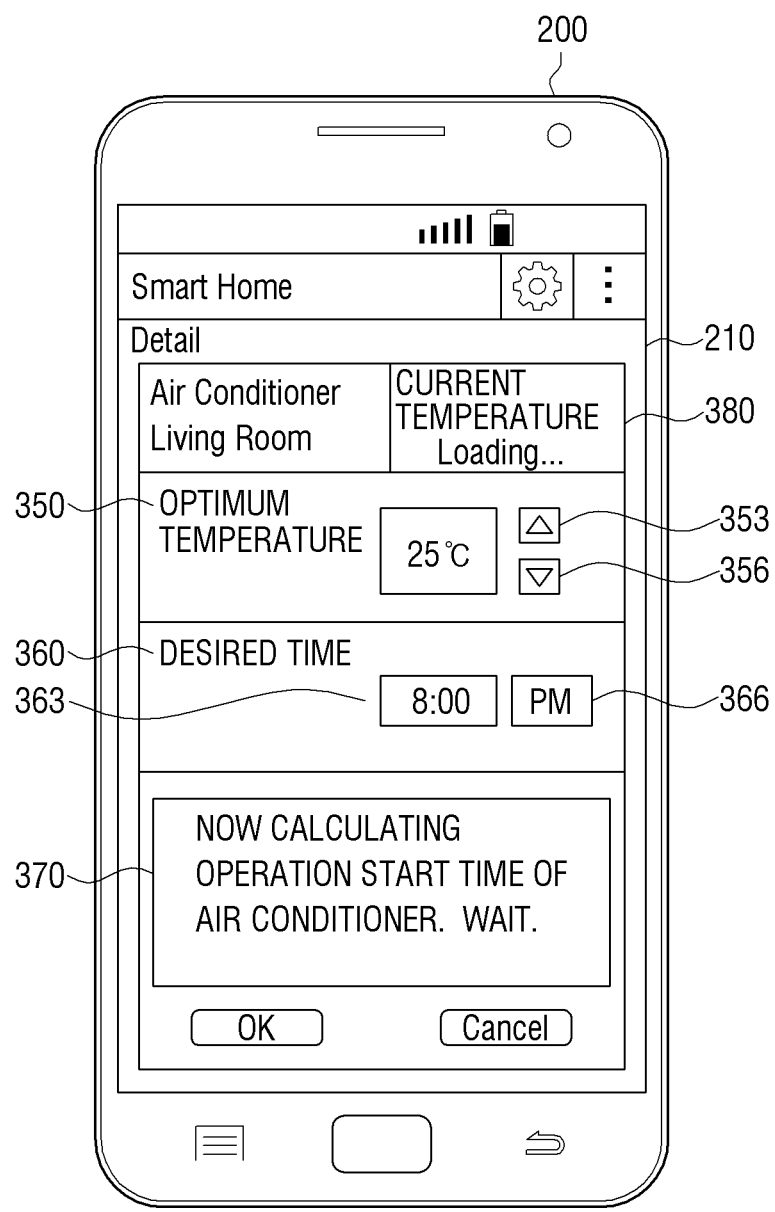
FIGS. 4 to 6 are views illustrating examples of application screens configured to display a condition for driving a heating and cooling device according to an exemplary embodiment.
Figure 5:
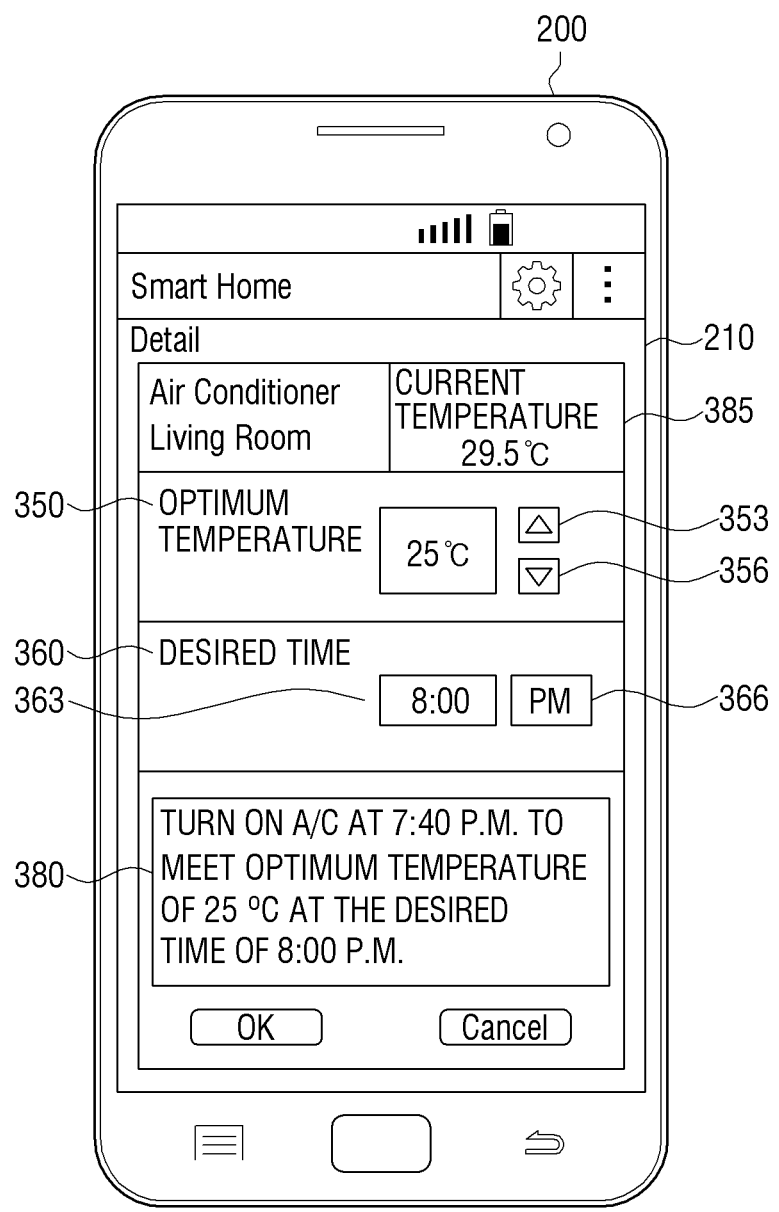
Figure 6:
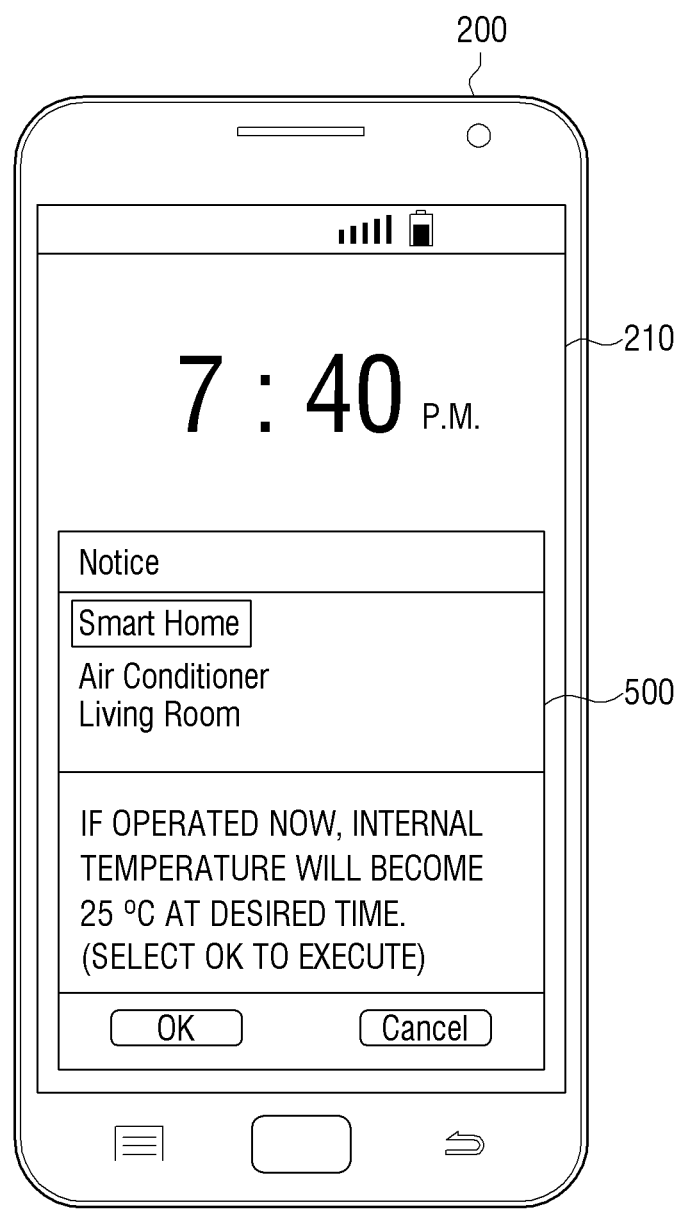

FIGS. 4 to 6 are views illustrating examples of application screens configured to display a driving condition of a heating and cooling device according to an exemplary embodiment.

As illustrated in FIG. 4, the user may connect to the home server 100 through an application of the user terminal apparatus 200, and may control the heating and cooling device 310 such as an air conditioner.

In response to execution of the application for access to the home server 100, the display 210 of the user terminal apparatus 200 may display an application execution screen for home network control such as 'Smart Home' shown in FIG. 4.

The home server 100 may sense an internal temperature of the home through a temperature sensor included in the sensor 120 coupled to the home server 100. The home server 100 may transmit the sensed internal temperature of the home to the user terminal apparatus 200. The 'Smart Home' application may display the internal temperature received from the home server 100. Therefore, while the home server 100 transmits the sensed internal temperature to the user terminal apparatus 200, the user terminal apparatus 200 may display information 380 indicating that the user terminal apparatus 200 is receiving the internal temperature of the home from the home server 100 as illustrated in FIG. 4.

The user terminal apparatus 200 may receive an input of an optimum temperature 350 desired by the user and a desired time 360, at which the inside of the home is set to the optimum temperature, from the user. The user terminal apparatus 200 may easily receive the optimum temperature input from the user through a temperature up key 353 and a temperature down key 356. The optimum temperature may be input in Celsius or Fahrenheit according to a region. The desired time 360 may be input in numbers through a time input box 363, and whether the desired time 360 is a.m. or p.m. may be input through an AM/PM toggle key 366. The keys may be physical keys or may be keys provided on a touch screen provided in conjunction with the display 210 of the user terminal apparatus 200.

In response to input of the optimum temperature 350 and the desired time 360 by the user, the user terminal apparatus 200 transmits information related to the input optimum temperature 350 and desired temperature 360 to the home server 100. While the user terminal apparatus 200 transmits the information to the home server 100 and receives a result predicted based on the information, the 'Smart Home' application may display a message 370 which requests the user to standby.

FIG. 5 is a view illustrating contents in which the user terminal apparatus 200 displays the 'Smart Home' application in response to receiving various pieces of information from the home server 100.

First, the home server 100 may transmit an internal temperature of the home sensed by the sensor 120 to the user terminal apparatus 200 through the communication interface 110. That is, the 'Smart Home' application may display the currently sensed internal temperature 385 of the home received from the home server 100.

Further, after the user sets the optimum temperature 350 and the desired time 360 and the optimum temperature 350 and the desired time 360 are transmitted to the home server 100, the home server 100 may predict a driving condition of the heating and cooling device 310 based on the optimum temperature 350 and the desired time 360 received from the user terminal apparatus 200 and the internal temperature of the home that is currently sensed through the sensor 120. That is, the home server 100 may calculate an operation duration (for example, several minutes) for which to operate the heating and cooling device 310 so that the inside of the home is set to the optimum temperature 350 at the desired time 360 received from the user.

For example, in response to the information, in which the optimum temperature is 25 degrees and the desired time is 8:00 p.m., being received from the user terminal apparatus 200, and the current internal temperature of the home, which is 29.5 degrees, being sensed through the sensor 120, the home server 100 may predict that the heating and cooling device 310 has to be operated for 20 minutes so that the internal temperature of the home is set to 25 degrees at the desired time of 8:00 p.m. Therefore, the home server 100 may transmit driving information indicating that the heating and cooling device should to be turned on at 7:40 p.m. and should be driven for 20 minutes to the user terminal apparatus 200.

The user terminal apparatus 200 may display the driving information of the heating and cooling device received from the home server 100. That is, like the above-described example, the user terminal apparatus 200 may display a phrase 380 stating "Turn on A/C at 7:40 p.m. to meet the optimum temperature of 25 degrees at the desired time of 8:00 p.m.".

As illustrated in FIG. 6, the user terminal apparatus 200 may display a notification window 500 through the display 210 at the predicted time.

That is, in response to displaying the phrase 380 stating "Turn on A/C at 7:40 p.m. to meet the optimum temperature of 25 degrees at the desired time of 8:00 p.m." and receiving a confirm command from the user in the user terminal apparatus 200, the user terminal apparatus 200 may display the notification window 500 at the predicted time of 7:40 p.m.

The notification window 500 may include a phrase for notifying the arrival of the predicted time, such as 'If operated now, the internal temperature will become 25 degrees at the desired time.', and a phrase such as '(Select OK to Execute)' for inquiring whether or not the heating and cooling device is to be operated.

Figure 7:
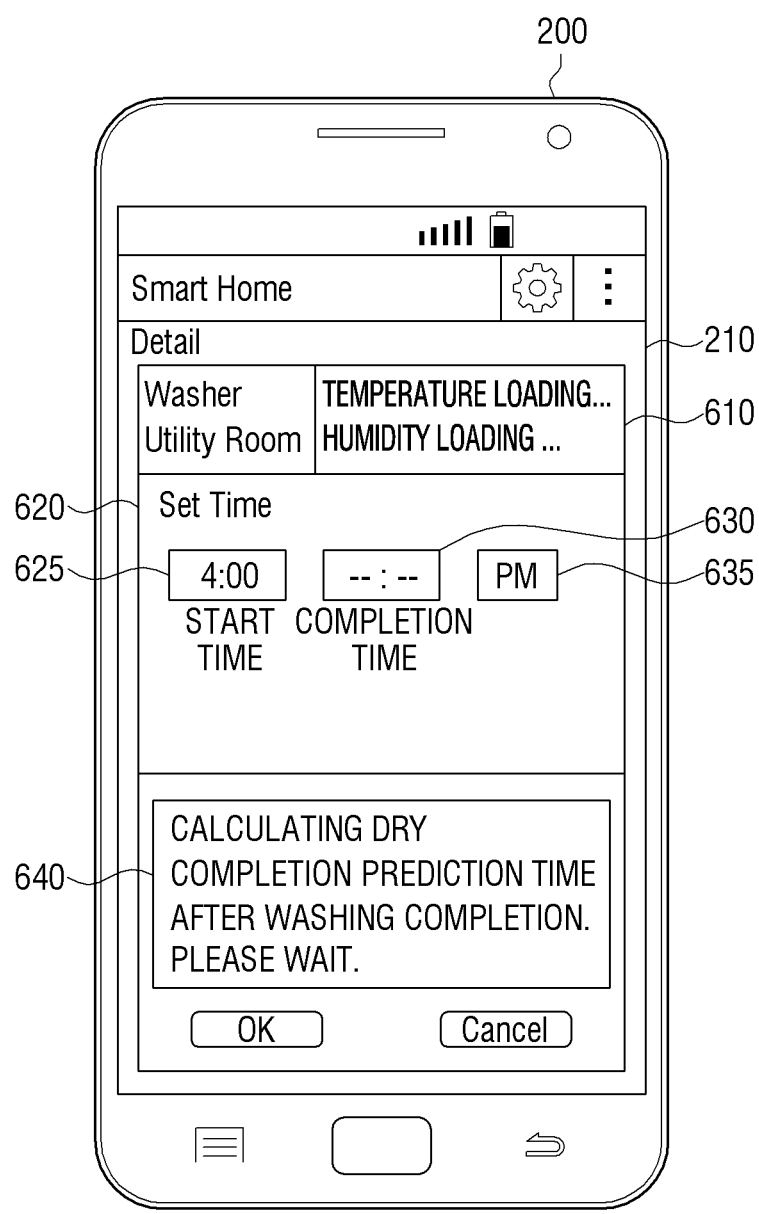
FIGS. 7 to 9 are views illustrating examples of application screens configured to display a condition for driving a washing machine according to an exemplary embodiment.

In response to input of a confirm command for executing the operation of the heating and cooling device, for example, clicking "OK" in FIG. 7, the user terminal apparatus 200 may transmit the confirm command to the home server 100. Then, the home server 100 may turn on the operation of the heating and cooling device according to the confirm command received from the user terminal apparatus 200. On the other hand, when the user clicks "Cancel", the home server 100 does not turn on the operation. In this latter case, the user terminal apparatus 200 may send a command to the home server 100 to confirm that the heating and cooling device should not be operated. Alternatively, the user terminal apparatus 200 may omit sending a command to the home server 100, and the home server 100 may determine not to operate the heating and cooling device after not receiving a response after a set amount of time, or for example, after 7:40 pm passes without receiving a confirmation command from the user terminal apparatus 200.

The display 210 may display the notification window 500 a preset number of times at preset time intervals. For example, the display 210 may display the notification window 500 at the predicted time of 7:40 p.m. once. Alternatively, the display 210 may display the notification window 500 at 5 minute intervals three times. That is, the display 210 may display the notification window at 7:30 p.m., 7:35 p.m., and 7:40 p.m. The number of times for display of the notification window 500 and the time interval of display of the notification window 500 may be changed according to a user's setting.

Even after the home server 100 predicts the driving condition and transmits the driving condition to the user terminal apparatus 200, the home server 100 may predict the internal temperature of the home at preset time intervals and re-predict the driving condition based on a changed internal temperature of the home in response to the internal temperature of the home being changed.

That is, the home server 100 may sense the internal temperature of the home as being 32 degrees at 1:00 p.m., and predict that the heating and cooling device has to be operated for 40 minutes to meet the optimum temperate of 25 degrees at the desired time of 8:00 p.m.

However, in the case of sensing the internal temperature of the home as being at 32 degrees at 1:00 p.m., there are about 7 hours from a time in which the internal temperature of the home is sensed to the desired time of 8:00 p.m. Therefore, in response to the time intervals being preset to two hours, the home server 100 may sense the internal temperature of the home at two hour intervals, and predict a duration in which the heating and cooling device has to be operated to meet the optimum temperate of 25 degrees at the desired time of 8:00 p.m. based on the sensed internal temperature of the home. Then, the home server 100 may transmit the re-predicted result to the user terminal apparatus 200 through the communication interface 110.

That is, in response to sensing that the internal temperature of the home has changed to 30 degrees at 3:00 p.m., the home server 100 may predict that the heating and cooling device has to be operated for 28 minutes to meet the optimum temperature of 25 degrees at the desired time of 8:00 p.m. Therefore, the home server 100 may transmit information related to the changed operation duration to the user terminal apparatus 200.

Then, in response to sensing that the internal temperature of the home has changed to 27 degrees at 5:00 p.m., the home server 100 may predict that the heating and cooling device has to be operated for 10 minutes to meet the optimum temperature of 25 degrees at the desired time of 8:00 p.m. Therefore, the home server 100 may transmit the information related to the changed operation duration to the user terminal apparatus 200.

In response to receiving the changed predicted result, the user terminal apparatus 200 may display a notification window configured to notify the changed predicted result through the display 210, immediately in response to receiving the changed predicted result, or at a preset time.

Figure 8:
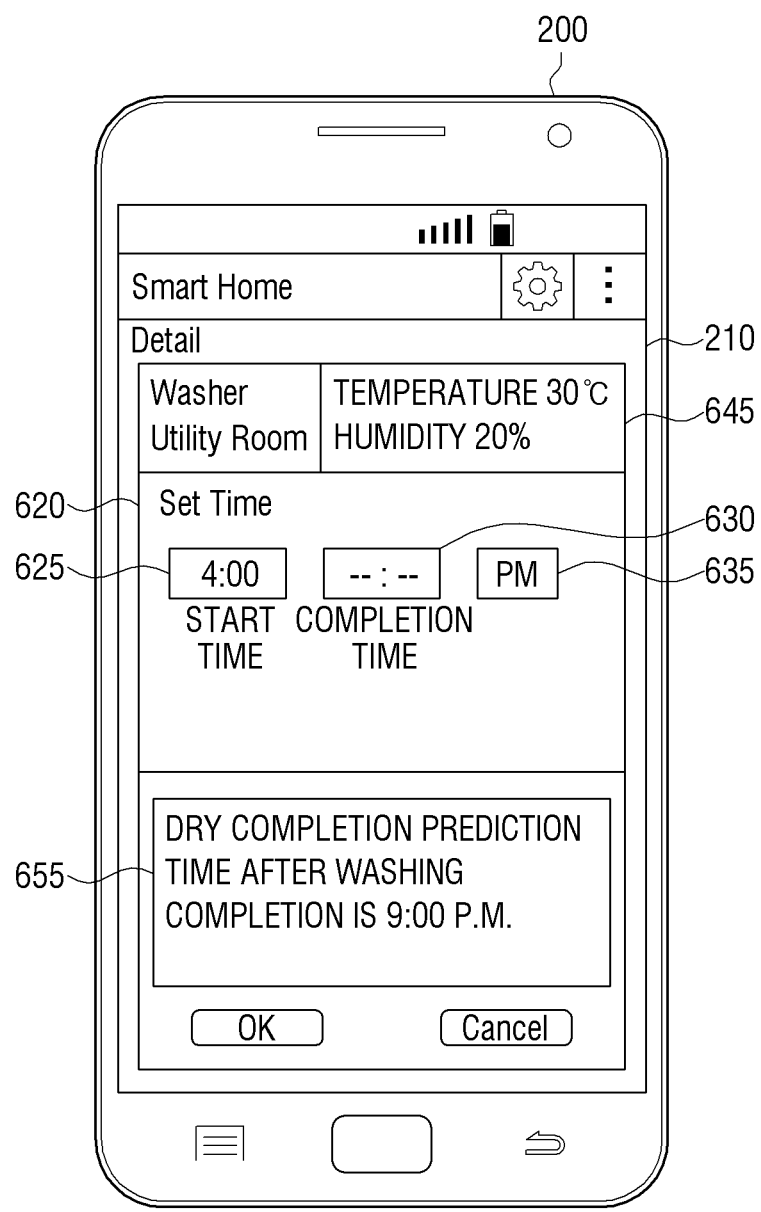
Figure 9:
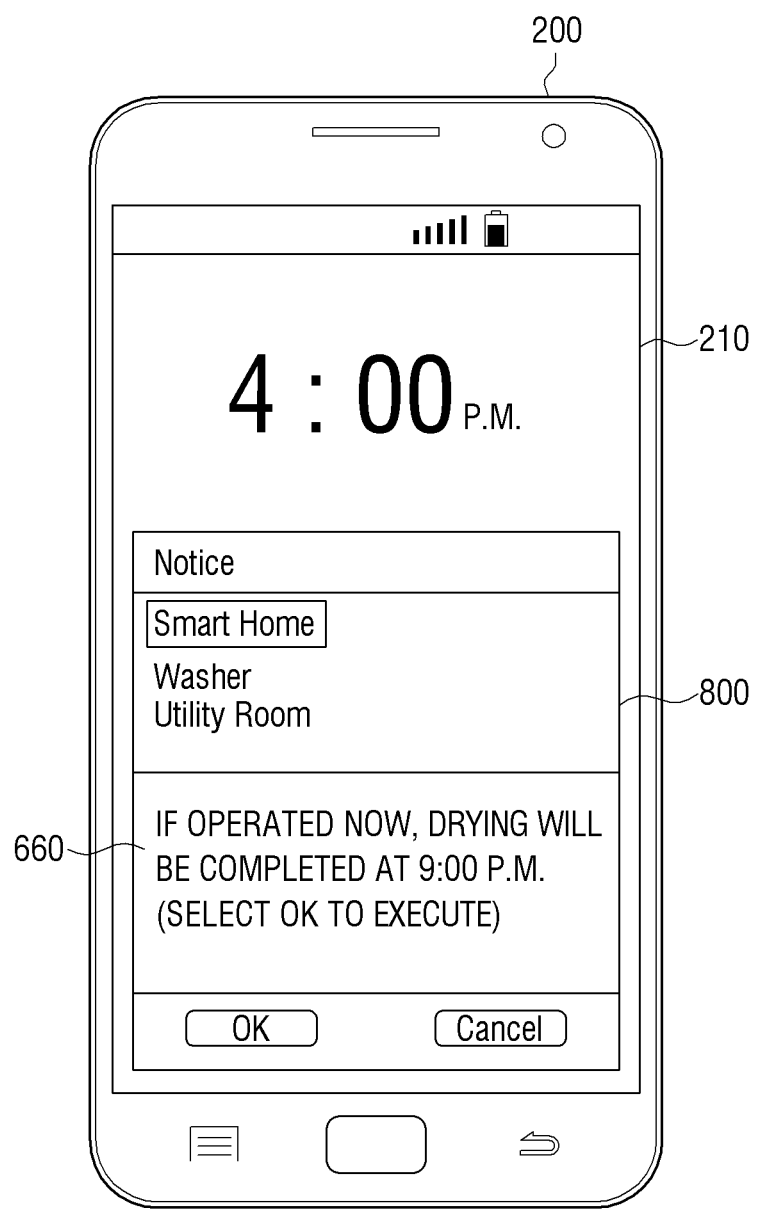

FIGS. 7 to 9 are views illustrating application screens configured to display a driving condition of a washing machine according to an exemplary embodiment.

As illustrated in FIG. 7, the user may connect to the home server 100 through an application of the user terminal apparatus 200, and control the washing machine 320 (see also FIG. 1).

In response to execution of the application for access to the home server 100, the display 210 of the user terminal apparatus 200 may display an application execution screen for home network control such as 'Smart Home'.

The home server 100 may sense an internal temperature and internal humidity of the home through a temperature sensor and a humidity sensor included in the sensor 120. The home server 100 may transmit the sensed internal temperature and internal humidity of the home to the user terminal apparatus 200. The 'Smart Home' application may display the internal temperature and internal humidity received from the home server 100. Therefore, while the home server 100 transmits the sensed internal temperature and internal humidity to the user terminal apparatus 200, the user terminal apparatus 200 may display information 610 indicating that the user terminal apparatus 200 is receiving the internal temperature and internal humidity of the home from the home server 100 as illustrated in FIG. 7.

The user terminal apparatus 200 may receive an input of time information 620 related to washing from the user. That is, the user terminal apparatus 200 may receive an input of a washing start time 625 or a washing completion time 630 desired by the user. The washing start time 625 or the washing completion time 630 may be input in numbers, and whether the washing start time 625 or the washing completion time 630 is a.m. or p.m. may be input through an AM/PM key 635.

The user terminal apparatus 200 may receive an input of both the washing start time 625 and the washing completion time 630 desired by the user, but the user terminal apparatus 200 may alternatively receive only one of the washing start time 625 and the washing completion time 630.

As illustrated in FIG. 7, in response to input of the washing start time 625 from the user, the user terminal apparatus 200 transmits information for the received washing start time 625 to the home server 100. While the user terminal apparatus 200 transmits the information to the home server 100 and receives a result predicted based on the information, the 'Smart Home' application may display a message 640 which indicates that a dry completion prediction time is being calculated and requests the user to standby.

FIG. 8 is a view illustrating contents in which the user terminal apparatus 200 displays the 'Smart Home' application in response to receiving various pieces of information from the home server 100.

First, the home server 100 may transmit an internal temperature and internal humidity of the home sensed through the sensor 120 to the user terminal apparatus 200 through the communication interface 110. That is, the 'Smart Home' application may display the internal temperature and internal humidity 645 of the home received from the home server 100.

Further, the home server 100 may predict a driving condition of the washing machine 320 based on the washing start time 625 received from the user terminal apparatus 200 and the internal temperature and internal humidity of the home sensed through the sensor 120. That is, in response to starting of the washing at the washing start time 625 received from the user, the home server 100 may calculate the time required to dry laundry according to the internal temperature and internal humidity of the home. The user may take a separate action to dry the laundry. Accordingly, based on the premise that the user takes a separate action to dry the laundry after the washing is completed, the home server 100 may predict how much time is required to dry the laundry according to the internal temperature and internal humidity of the home.

For example, in response to receiving the information for the washing start time of 4:00 p.m. from the user terminal apparatus 200, and sensing, through the sensor 120, that the internal temperature and internal humidity of the home are 30 degrees and 20%, the home server 100 may predict that it will take four hours to dry the laundry after washing completion. Therefore, the home server 100 may predict that the washing machine washes the laundry for 1 hour and it will take four hours to dry the laundry in view of the environment inside the home. The home server 100 may transmit information that the drying of the laundry will be completed at 9:00 p.m. to the user terminal apparatus 200.

The user terminal apparatus 200 may display driving information of the washing machine received from the home server 100. That is, like the above-described example, the user terminal apparatus 200 may display a phrase 655 that "Dry completion prediction time after washing completion is 9:00 p.m.".

As illustrated in FIG. 9, the user terminal apparatus 200 may display a notification window 800 through the display 210 at the predicted time.

That is, in response to execution of the operation of the washing machine at 4:00 p.m. input by the user, the user terminal apparatus 200 may display the phrase 655 that the dry completion prediction time after washing completion is 9:00 p.m. in view of a current home environment as shown in FIG. 8, and in response to an "OK" confirm command being received from the user, the user terminal apparatus 200 may display the notification window 800 at the washing start time of 4:00 p.m., as shown in FIG. 9.

The notification window 800 may include a phrase 660 for notifying the washing completion prediction time including a dry time, such as "If operated now, drying will be completed at 9:00 p.m.", and a phrase "(Select OK to Execute)" for inquiring whether or not the washing machine is operated.

In response to input of a confirm command for executing the operation of the washing machine for example, clicking "OK" in FIG. 9, the user terminal apparatus 200 may transmit the confirm command to the home server 100. Then, the home server 100 may turn on the operation of the washing machine according to the confirm command received from the user terminal apparatus 200. On the other hand, when the user clicks "Cancel", the home server 100 does not turn on the operation. In this latter case, the user terminal apparatus 200 may send a command to the home server 100 to confirm that the washing machine 320 should not be operated. Alternatively, the user terminal apparatus 200 may omit sending a command to the home server 100, and the home server 100 may determine not to operate the washing machine after not receiving a response after a set amount of time, or for example, after 4:00 pm passes without receiving a confirmation command from the user terminal apparatus 200.

The display 210 may display the notification window 800 a preset number of times at preset time intervals. For example, the display 210 may display the notification window 800 once at the predicted time of 4:00 p.m. Alternatively, the display 210 may display the notification window 800 at 5 minute intervals three times. That is, the display 210 may display the notification window at 3:50 p.m., 3:55 p.m., and 4:00 p.m. The number of times for display of the notification window 800 and the time interval of display of the notification window 800 may be changed according to a user's setting.

Even after the home server 100 predicts the driving condition and transmits the driving condition to the user terminal apparatus 200, the home server 100 may predict the internal temperature and internal humidity of the home at preset time intervals and re-predict the driving condition based on the changed internal temperature and internal humidity of the home in response to the internal temperature and internal humidity of the home being changed.

That is, in response to sensing, at 9:00 p.m., that the internal temperature and internal humidity of the home are, for example, 22 degrees and 45%, and starting of the washing at the washing start time of 4:00 p.m., the home server 100 may predict 1 hour for the washing time and 7 hours for the drying time.

However, in response to the time interval being preset to one hour, the home server 100 may sense the internal temperature and internal humidity of the home at one hour intervals, and re-predict the drying time and the washing completion time based on the newly sensed internal temperature and internal humidity of the home. Then, the home server 100 may transmit the re-predicted result to the user terminal apparatus 200 through the communication interface 110.

In response to the changed predicted result being received, the user terminal apparatus 200 may display a notification window configured to notify the changed predicted result through the display 210, immediately in response to receiving the changed predicted result, or at the preset time.

FIGS. 10 to 13 are views illustrating application screens configured to display a driving condition of a TV according to an exemplary embodiment.

Figure 10:
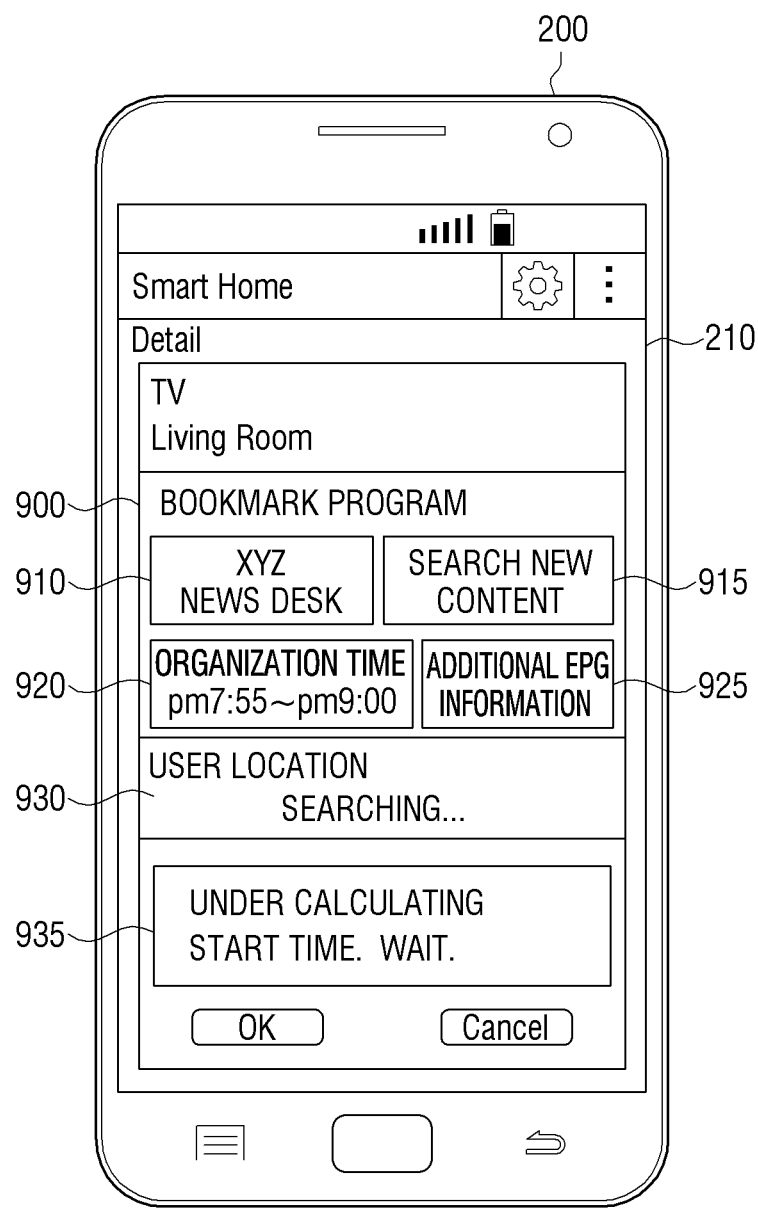
FIGS. 10 to 13 are views illustrating examples of application screens configured to display a condition for driving a display apparatus according to an exemplary embodiment.

As illustrated in FIG. 10, the user may connect to the home server 100 through an application of the user terminal apparatus 200, and acquire information for driving the TV 330 (see FIG. 1).

In response to execution of the application for access to the home server 100, the display 210 of the user terminal apparatus 200 may display an application execution screen for home network control such as 'Smart Home' shown in FIG. 10.

The user terminal apparatus 200 may receive a multimedia content name. In particular, the user terminal apparatus 200 may store multimedia content that has been searched for a preset number of times by the user, or multimedia content set by the user in a bookmark program. For example, the user terminal apparatus 200 may store at least one of content file, name, and URL link of actual multimedia.

For example, as illustrated in FIG. 10, in response to input of a user command for selecting "XYZ News Desk" among a plurality of programs stored in the bookmark program, the user terminal apparatus 200 may display a multimedia content name 910 and organization time information 920.

The organization time information 920 may be extracted from EPG information collected by the user terminal apparatus 200 and stored in the user terminal apparatus 200. Alternatively, since the home server 100 may transmit the EPG information received from an external server to the user terminal apparatus 200, the user terminal apparatus 200 may extract the organization time information 920 from the received EPG information.

The user terminal apparatus 200 may display a search menu 915 so that the user may search new multimedia content. The user terminal apparatus 200 may display an additional information menu 925 which may display information other than the organization time information 920. In response to the user clicking "OK", the home server 100 may control the TV to set the selected multimedia content, for example, the program "XYZ News Desk" as shown in FIG. 10.

The user terminal apparatus 200 may include a global positioning system (GPS), and the user terminal apparatus 200 may sense a location in which the user terminal apparatus 200 is located and display the sensing result. While the GPS senses the location of the user terminal apparatus 200, the display 210 may display a phrase 930 indicating that the user location is searching.

The home server 100 may collect an organization time of a multimedia program and road traffic information included in the EPG information collected through the communication interface 110. The home server 100 may receive location information of the user terminal apparatus 200 from the user terminal apparatus 200.

The home server 100 may predict the time for the user to come to the home from the location of the user terminal apparatus 200 using a public transportation, a car, or the like based on the collected road traffic information and location information of the user terminal apparatus 200. The home server 100 may calculate a user departure time based on the predicted time and transmit the calculated result to the user terminal apparatus 200. While the home server 100 is calculating the user departure time, the display 210 may display a phrase 935 indicating that the time is being calculated.

Figure 11:
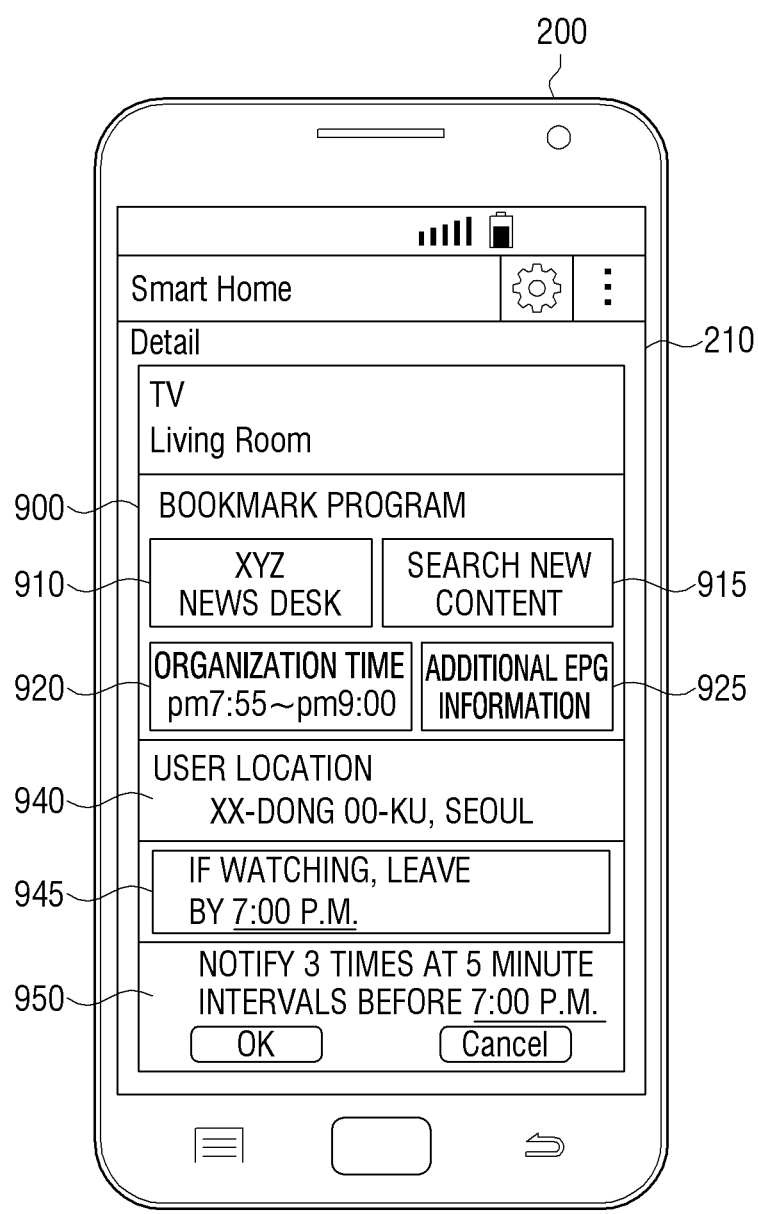

FIG. 11 is a view illustrating contents in which the user terminal apparatus 200 displays a 'Smart Home' application in response to various pieces of information being received from the home server 100.

First, the user terminal apparatus 200 may display location information 940 of the user terminal apparatus 200 sensed through a GPS.

The home server 100 may collect road traffic information, calculate a user departure time based on the predicted time that it will take for movement of the user, and transmit the calculated result to the user terminal apparatus 200 through the communication interface 110. That is, the 'Smart Home' application may display a phrase 945 indicating the user departure time received from the home server 100.

For example, in response to receiving, from the user terminal apparatus 200, the information in which the multimedia content name is "XYZ News Desk" and the location information in which a location of the user terminal apparatus 200 is "XX-dong 00-ku, Seoul", the home server 100 may predict that the time it will take for the movement of the user from "XX-dong 00-ku, Seoul" to the home is 55 minutes based on the collected road traffic condition. Therefore, the home server 100 may transmit the information in which the user has to leave by 7:00 p.m. to watch "XYZ News Desk" to the user terminal apparatus 200.

That is, the user terminal apparatus 200 may display information related to the user departure time received from the home server 100. As described above, the user terminal apparatus 200 may display the phrase 945 indicating that "If watching, leave by 7:00 p.m.".

The user terminal apparatus 200 may display a phrase for setting an alarm time to notify a departure time before the predicted user departure time. That is, the user terminal apparatus 200 may display an alarm setting phrase 950. The alarm setting may be preset before the user executes the application.

Figure 12:
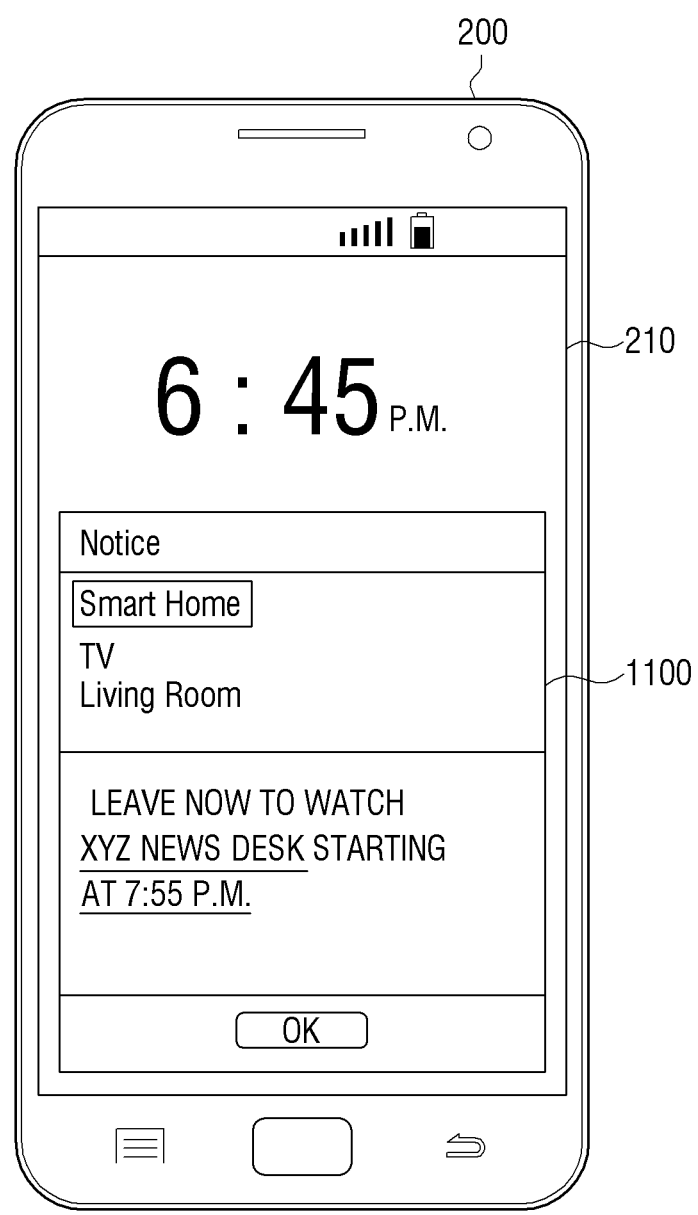

As illustrated in FIG. 12, the user terminal apparatus 200 may display a notification window 1100 at a preset alarm time through the display 210. That is, the user terminal apparatus 200 may display a phrase that the user should leave so that the user arrives by 7:55 p.m., which is an organization time of "XYZ News Desk", through the notification window 1100.

Specifically, since the alarm is set to notify the predicted departure time three times at 5 minute intervals before 7:00 p.m., which is the predicted departure time, the user terminal apparatus 200 may display the notification window 1100 at 6:45 p.m., 6:50 p.m., and 6:55 p.m. A phrase for requesting the departure of the user, such as "Leave now to watch XYZ News Desk starting at 7:55 p.m.

Further, even after the home server 100 may predict the user departure time and transmit the predicted user departure time to the user terminal apparatus 200, the home server 100 may receive changed road traffic condition information at preset time intervals through the communication interface 110 and re-predict the user departure time based on the changed road traffic information in response to the road traffic information being changed.

That is, the home server 100 may predict that the user may leave at 7:35 p.m. from "XX-dong 00-ku, Seoul" to watch "XYZ News Desk" starting from 7:55 p.m. based on the updated road traffic condition collected at 4:00 p.m. that shows traffic is not as heavy as before.

In response to receiving, in the home server 100, changed road traffic information from an external server or a changed location of the user terminal apparatus 200 from the user terminal apparatus 200 before 7:55 p.m. which is the start time of "XYZ News Desk", the home server 100 may re-predict the time it will take for the user to move from the user location to the home and re-calculate the user departure time again. The home server 100 may transmit the changed user departure time to the user terminal apparatus 200.

Figure 13:
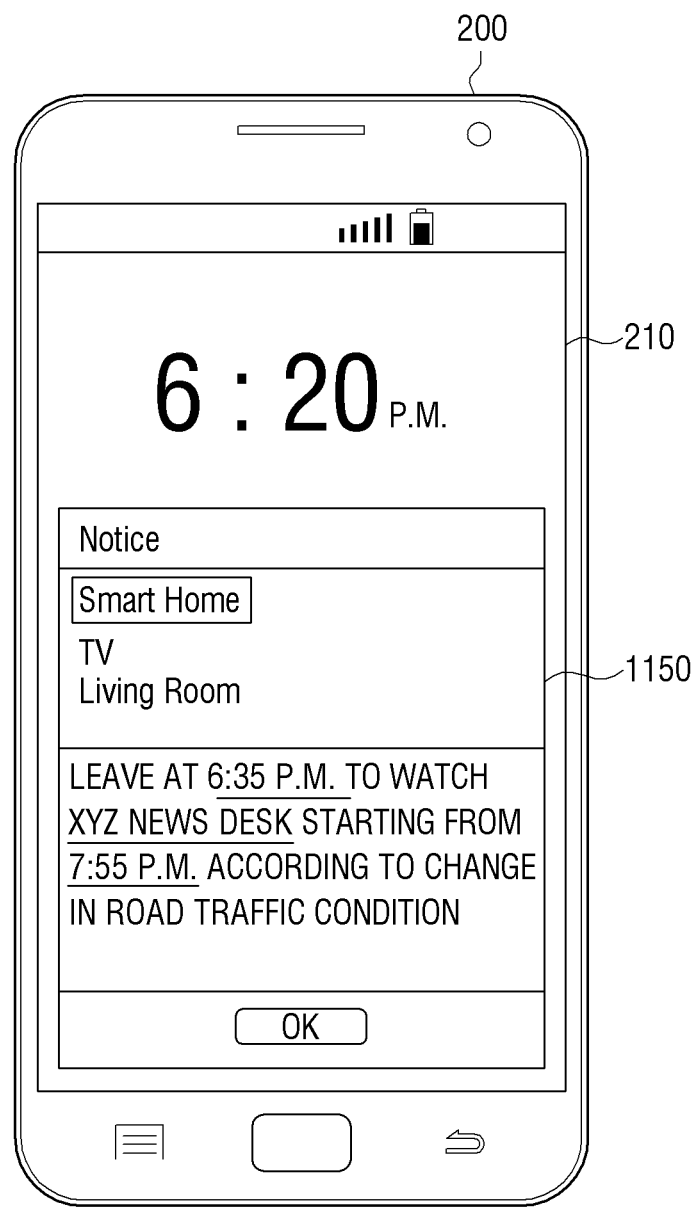

As shown in FIG. 13, the user terminal apparatus 200 may display a notification window 1150 configured to display new information, immediately in response to receiving the new information from the home server 100 or within a preset time. That is, as illustrated in FIG. 13, the user terminal apparatus 200 may display a phrase that "Leave at 6:35 p.m. to watch XYZ News Desk starting from 7:55 p.m. according to change in the road traffic condition".

The EPG information and the road traffic information may be collected in the home server 100 and transmitted to the user terminal apparatus 200. However, this is merely exemplary, and the EPG information and the road traffic information may be collected in the user terminal apparatus 200 and transmitted to the home server 100 or stored therein.

Figure 14:
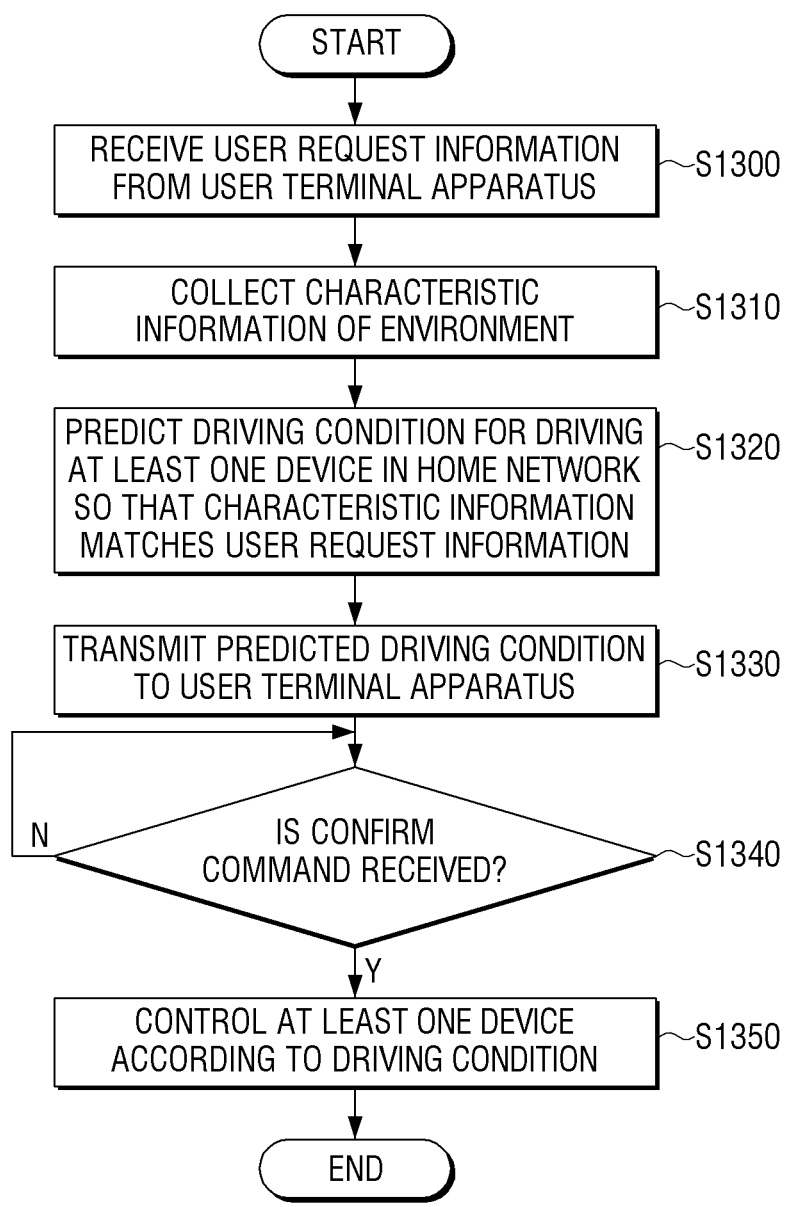
FIG. 14 is a flowchart illustrating an example of a home network control method of a home server which manages a home network according to an exemplary embodiment.

FIG. 14 is a flowchart illustrating a home network control method of the home server 100 according to an exemplary embodiment.

First, the home server 100 receives user request information from the user terminal apparatus 200 (S1300). The user request information is information requesting to drive various devices so that the user sets an environment of the home to a desired environment. That is, the user request information may include a desired temperature, desired humidity, a user arrival time, a washing start time, a washing completion time, an operation time of a multimedia content reproduction apparatus, and a content name to be reproduced, or the like.

The home server 100 collects characteristic information of the environment (S1310). The environment includes an environment inside the home and/or an environment outside the home. The characteristic information may include various pieces of information indicating characteristics inside and/or outside the home. For example, the characteristic information may include an internal temperature of the environment of the home, an internal humidity of the environment of the home, EPG information, and/or road traffic condition information, or the like.

The home server 100 may receive the EPG information and the road traffic condition information from an external server.

Information including content information commonly called content-related information is referred to as the EPG information. For example, the EPG information may include any information related to content, such as a content name, a content type, content classification, a reproduction duration, a cast, a director, and/or a writer. The content information may include any information corresponding to the content, such as a content name, a content broadcast period of time, a content broadcast day, a content broadcast time, a content kind, a content type, content classification, a content director, a content cast, and/or a content plot.

The road traffic condition information may include route information of a public transportation and/or real-time road condition information. That is, the road traffic condition information is information used as the basis for accurately calculating a time it will take for the user to move from a first point to a second point.

The home server 100 may predict a driving condition for driving at least one device in a home network so that the characteristic information matches the user request information (S1320). For example, in response to receiving a desired temperature and a user arrival time from the user terminal apparatus 200 and sensing an internal temperature of the home as environment information, the home server 100 may calculate the operation start time and the operation duration of the heating and cooling device 310, in order for the internal temperature of the home to be the desired temperature, and predict the driving condition.

The home server 100 may transmit the predicted driving condition to the user terminal apparatus 200 (S1330). In response to receiving a confirm command for the driving condition from the user terminal apparatus (S1340-Y), the home server 100 may control at least one device according to the driving condition (S1350). For example, in response to calculating the operation start time and the operation duration of the heating and cooling device 310 for the internal temperature of the home to be the desired temperature as the driving condition, the home server 100 transmits the operation start time and the operation duration to the user terminal apparatus 200. Then, in response to receiving a confirm command from the user for operating the heating and cooling device 310 at the operation start time from the user terminal apparatus 200, the home server 100 controls the operation of the heating and cooling device 310 to start at the operation start time The user terminal apparatus 200 may be an electronic apparatus configured to receive a user command, such as a portable phone, a tablet PC, or a laptop computer, or the like. The device may be the heating and cooling device 310, the washing machine 320, and/or the TV 330. However, this is merely exemplary, and the device may be implemented with various apparatuses such as various illumination equipment, security equipment, and/or home appliances (for example, a cleaner) used in the home for the convenience of the user.

The home network control methods according to the above-described various exemplary embodiments may be coded in software and stored in a non-transitory computer-recordable medium. The non-transitory computer-recordable medium may be mounted on and/or used in various apparatuses.

The non-transitory computer-recordable medium is not a medium configured to temporarily store data such as a register, a cache, or a memory but an apparatus-readable medium configured to semi-permanently store data. Specifically, the non-transitory apparatus-readable medium may be a compact disc (CD), a digital versatile disc (DVD), a hard disc, a Blu-ray disc, a universal serial bus (USB), a memory card, or a read only memory (ROM).

According to the above-described various exemplary embodiments, a home server capable of predicting driving conditions of devices according to environments and a network control method thereof, and a home network control system and a control method thereof may be provided.

Additional aspects and advantages of the exemplary embodiments will be obvious from the detailed description, or may be learned by practicing the exemplary embodiments.

The foregoing exemplary embodiments and advantages are merely exemplary and are not to be construed as limiting. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A method of controlling a home server which manages a home network, the method comprising:
   receiving request information to change a characteristic of a surrounding environment of an area in which the home server is located from a user terminal apparatus;
   collecting characteristic information of the surrounding environment;
   identifying a device comprising a function corresponding to the characteristic which change according to the request information from among the devices connected to the home network;
   identifying a driving condition of the device to change current characteristic according to the characteristic information to the characteristic corresponding to the request information;
   transmitting the driving condition to the user terminal apparatus; and
   controlling the device according to the driving condition in response to receiving a confirm command for the driving condition from the user terminal apparatus.

2. The method as claimed in claim 1, wherein the request information comprises at least one from among a temperature, a humidity, a user arrival time, a washing start time, a washing completion time, an operation time of a multimedia content reproduction apparatus, and a content name to be reproduced.

3. The method as claimed in claim 2, wherein the characteristic information comprises at least one from among an internal temperature of the surrounding environment, an internal humidity of the surrounding environment, an electronic program guide (EPG) information, and information related to a road traffic condition.

4. The method as claimed in claim 1, wherein, in response to the request information comprising a temperature and a user arrival time, and the characteristic information comprising an internal temperature of the surrounding environment, the predicting of the driving condition comprises calculating an operation start time and an operation duration of a heating and cooling device to change the internal temperature to the temperature.

5. The method as claimed in claim 1, wherein, in response to the request information comprising a washing start time and the characteristic information comprising an internal temperature and internal humidity of the surrounding environment, the predicting of the driving condition comprises calculating a laundry drying time or a washing completion prediction time according to the internal temperature and internal humidity.

6. The method as claimed in claim 1, wherein, in response to the request information comprising a name of multimedia content to be displayed and information for a user location, and the characteristic information comprising electronic program guide (EPG) information and information related to a road traffic condition, the predicting of the driving condition comprises calculating a time it will take for the user to arrive home to the surrounding environment according to the user location and the road traffic condition, and calculating a user departure time based on a broadcast time of the multimedia content and the time it will take for the user to arrive home.

7. The method as claimed in claim 1, wherein the surrounding environment comprises an internal environment and an external environment of the home server.

8. The method as claimed in claim 1, further comprising periodically collecting updated characteristic information of the surrounding environment, and re-identifying the driving conditions based on the updated characteristic information.

9. A home server which manages a home network, the home server comprising:
   a communication interface;
   a sensor;
   a storage device; and
   a controller configured to:
      control the sensor to collect characteristic information of a surrounding environment of an area in which the home server is located,
      in response request information to change characteristic of the surrounding environment received from a user terminal apparatus through the communication interface, identify a device comprising a function corresponding to the characteristic which change according to the request information from among the devices connected to the home network,
      identify driving condition of the device to change current characteristic according to the characteristic information to the characteristic corresponding to the request information, and
      transmit the driving condition to the user terminal apparatus through the communication interface,
   wherein, in response to receiving a confirm command for the driving condition from the user terminal apparatus through the communication interface, the controller controls the device according to the driving condition stored in the storage device.

10. The home server as claimed in claim 9, wherein the request information comprises at least one of a temperature, a humidity, a user arrival time, a washing start time, a washing completion time, an operation time of a multimedia content reproduction apparatus, and a content name to be reproduced.

11. The home server as claimed in claim 10, wherein the characteristic information comprises at least one of an internal temperature of the surrounding environment, an internal humidity of the surrounding environment, an electronic program guide (EPG) information, and information related to a road traffic condition.

12. The home server as claimed in claim 9, wherein, in response to the request information comprising a temperature and a user arrival time, and the characteristic information comprising an internal temperature of the surrounding environment, the controller identifies the driving condition by calculating an operation start time and an operation duration of a heating and cooling device to change the internal temperature to the temperature.

13. The home server as claimed in claim 9, wherein, in response to the request information comprising a washing start time, and the characteristic information comprising an internal temperature and internal humidity of the surrounding environment, the controller identifies the driving condition by calculating a laundry drying time or a washing completion prediction time according to the internal temperature and internal humidity.

14. The home server as claimed in claim 9, wherein the driving condition for driving device corresponds to notifying the user terminal apparatus, and wherein, in response to the request information comprising a name of multimedia content to be displayed and information for a user location, and the characteristic information comprising electronic program guide (EPG) information and information related to a road traffic condition, the controller calculates a time it will take for the user to arrive home to the environment according to the user location and the road traffic condition, and identifies the driving condition by calculating a user departure time based on a broadcast time of the multimedia content and the time it will take for the user to arrive home.

15. The home server as claimed in claim 9, wherein the surrounding environment comprises an internal environment and an external environment of the home server.

16. A home network control system, comprising:
    a user terminal apparatus configured to receive request information to change characteristic of a surrounding environment of an area in which the home server is located and transmit the received request information to the home server; and
    the home server configured to:
        collect characteristic information of the surrounding environment,
        identify a device comprising a function corresponding to the characteristic which change according to the request information from among the devices connected to the home network,
        identify a driving condition of the device to change current characteristic according to the characteristic information to the characteristic corresponding to the request information,
    wherein the user terminal apparatus displays the driving condition received from the home server, and, in response to receiving a confirm command input by a user of the user terminal apparatus, transmits a confirm command to the home server.

17. A method comprising:
    receiving an input of request information to change a characteristic of a surrounding environment of an area in which the home server is located and transmitting the request information to the home server, by a user terminal apparatus;
    collecting characteristic information of the surrounding environment by the home server;
    identifying a device comprising a function corresponding to the characteristic which change according to the request information from among the devices connected to the home network by the home server;
    identifying driving condition of the device to change current characteristic according to the characteristic information to the characteristic corresponding to the request signal;
    transmitting the driving condition to the user terminal apparatus, by the home server;
    displaying the driving condition received from the home server, by the user terminal apparatus; and
    transmitting a confirm command to the home server from the user terminal apparatus in response to input of the confirm command by the user at the user terminal apparatus.

18. A home server communicatively coupled to a home network, the home server comprising:
    a communication interface;
    a sensor;
    a storage device; and
    a controller configured to:
        control the sensor to collect characteristic information of a surrounding environment of an area in which the home server is located, and
        in response to control information received through the communication interface, identify a control condition for controlling a device communicatively coupled to the home server according to the received control information and the collected characteristic information, store the control condition in the storage device, and transmit the control condition through the communication interface,
    wherein, in response to receiving a confirm command through the communication interface, the controller controls the device according to the control condition stored in the storage device.

19. The home server as claimed in claim 18, wherein the device is a user terminal apparatus from which the control information is received.

20. The home server as claimed in claim 19, wherein the control information is received from a user terminal apparatus, and the device is a device included in the home network.

* * * * *